United States Patent
York et al.

(10) Patent No.: US 9,531,722 B1
(45) Date of Patent: Dec. 27, 2016

(54) METHODS FOR GENERATING AN ACTIVITY STREAM

(71) Applicant: Google Inc., Mountain View, CA (US)

(72) Inventors: George York, Lyons, CO (US); Donald Dylan Douglas, Longmont, CO (US); William Buckner Davis, Mountain View, CA (US)

(73) Assignee: GOOGLE INC., Mountain View, CA (US)

( * ) Notice: Subject to any disclaimer, the term of this patent is extended or adjusted under 35 U.S.C. 154(b) by 0 days.

(21) Appl. No.: 14/068,184

(22) Filed: Oct. 31, 2013

(51) Int. Cl.
| | |
|---|---|
| *G06F 7/04* | (2006.01) |
| *G06F 17/30* | (2006.01) |
| *H04N 7/16* | (2011.01) |
| *H04L 29/06* | (2006.01) |
| *G06F 21/62* | (2013.01) |

(52) U.S. Cl.
CPC ......... H04L 63/101 (2013.01); *G06F 21/6218* (2013.01); *G06F 21/6227* (2013.01)

(58) Field of Classification Search
CPC .... H04L 51/32; H04L 67/22; H04L 29/06823; H04L 29/06829; H04L 29/06836; H04L 29/0685; H04N 21/2187; H04W 12/08; G06F 21/6218; G06F 2221/2141; G06F 17/30424; G06F 17/30699; G06F 17/30516; G06F 21/6209; G06F 21/60; G06F 21/604; G06F 21/62; G06F 21/6227; G06F 21/6245; G06Q 50/01
USPC .......................................................... 726/28
See application file for complete search history.

(56) References Cited

U.S. PATENT DOCUMENTS

| | | | |
|---|---|---|---|
| 5,450,593 A | * | 9/1995 | Howell ............... G06F 21/6218 340/5.28 |
| 5,579,471 A | | 11/1996 | Barber et al. |
| 6,006,239 A | | 12/1999 | Bhansali et al. |

(Continued)

FOREIGN PATENT DOCUMENTS

| | | |
|---|---|---|
| EP | 0371608 | 6/1990 |
| EP | 1275222 | 1/2003 |

(Continued)

OTHER PUBLICATIONS

Automatic Album Maker Moment.me Arrives on Android, Adds A "Manual Mode" Mode to Boost Engagement, TechCrunch, Feb. 18, 2013, http://techcrunch.com/2013/02/18/automatic-album-maker-moment-me-arrives-on-android-adds-a-manual-mode-mode-to-boost-engagement/.

(Continued)

*Primary Examiner* — David García Cervetti
*Assistant Examiner* — Amie C Lin
(74) *Attorney, Agent, or Firm* — Young Basile Hanlon & MacFarlane, P.C.

(57) ABSTRACT

A method includes receiving, at one or more server computers, an activity information request regarding an object; determining whether a user associated with the activity information request is currently authorized to access the object or was previously authorized to access the object; if the user is currently authorized to access the object, permitting unrestricted access to a plurality of activity information items describing actions associated with the object; and if the user was previously authorized to access the object, permitting access to a filtered set of activity information items based on the plurality of activity information items.

18 Claims, 6 Drawing Sheets

(56) References Cited

U.S. PATENT DOCUMENTS

| | | |
|---|---|---|
| 6,009,405 A | 12/1999 | Leymann et al. |
| 6,119,165 A | 9/2000 | Li et al. |
| 6,314,105 B1 | 11/2001 | Luong |
| 6,449,688 B1 | 9/2002 | Peters et al. |
| 6,507,845 B1 | 1/2003 | Cohen et al. |
| 6,590,568 B1 | 7/2003 | Astala et al. |
| 6,614,804 B1 | 9/2003 | McFadden et al. |
| 6,687,735 B1 | 2/2004 | Logston et al. |
| 6,711,557 B1 | 3/2004 | Palaniappan |
| 6,947,396 B1 | 9/2005 | Salmi |
| 7,030,861 B1 | 4/2006 | Westerman et al. |
| 7,113,917 B2 | 9/2006 | Jacobi et al. |
| 7,146,377 B2 | 12/2006 | Nowicki et al. |
| 7,386,576 B2 | 6/2008 | Watanabe et al. |
| 7,536,386 B2 | 5/2009 | Samji et al. |
| 7,620,902 B2 | 11/2009 | Manion et al. |
| 7,660,902 B2 | 2/2010 | Graham et al. |
| 7,711,771 B2 | 5/2010 | Kirnos |
| 7,756,821 B2 | 7/2010 | Havens et al. |
| 7,821,405 B2 | 10/2010 | Heidloff et al. |
| 7,827,299 B2 | 11/2010 | Cadarette et al. |
| 7,904,303 B2 | 3/2011 | Chien et al. |
| 7,908,183 B2 | 3/2011 | Jacobi et al. |
| 7,945,600 B1 | 5/2011 | Thomas et al. |
| 8,041,672 B2 | 10/2011 | Ogawa et al. |
| 8,132,111 B2 | 3/2012 | Baron et al. |
| 8,156,059 B2 | 4/2012 | Dunning et al. |
| 8,194,986 B2 | 6/2012 | Conwell |
| 8,196,047 B2 | 6/2012 | Fisher et al. |
| 8,285,700 B2 | 10/2012 | Steelberg et al. |
| 8,298,087 B1 | 10/2012 | Smith |
| 8,407,613 B2 | 3/2013 | Hope |
| 8,412,731 B2 | 4/2013 | Aubert et al. |
| 8,417,000 B1 | 4/2013 | Mendis |
| 8,429,565 B2 | 4/2013 | Agarawala et al. |
| 8,458,174 B1 | 6/2013 | Duerig |
| 8,464,184 B1 | 6/2013 | Cook et al. |
| 8,467,955 B2 | 6/2013 | Jiang et al. |
| 8,468,164 B1 | 6/2013 | Paleja et al. |
| 8,479,122 B2 | 7/2013 | Hotelling et al. |
| 8,504,565 B2 | 8/2013 | Pitts |
| 8,522,230 B2 | 8/2013 | Nathan et al. |
| 8,522,258 B1 | 8/2013 | Shaw |
| 8,532,400 B1 | 9/2013 | Babenko et al. |
| 8,547,352 B2 | 10/2013 | Park et al. |
| 8,548,844 B2 | 10/2013 | Steelberg et al. |
| 8,555,173 B2 | 10/2013 | Kast |
| 8,560,975 B2 | 10/2013 | Beaver et al. |
| 8,571,331 B2 | 10/2013 | Cifarelli |
| 8,584,022 B1 | 11/2013 | O'Shaughnessy et al. |
| 8,612,439 B2 | 12/2013 | Prahlad et al. |
| 8,612,470 B1 | 12/2013 | Fushman et al. |
| 8,624,836 B1 | 1/2014 | Miller et al. |
| 8,638,312 B2 | 1/2014 | Lim |
| 8,644,688 B2 | 2/2014 | Fishman et al. |
| 8,661,053 B2 | 2/2014 | Flynn et al. |
| 8,670,597 B2 | 3/2014 | Petrou et al. |
| 2002/0054117 A1 | 5/2002 | van Dantzich et al. |
| 2002/0099844 A1 | 7/2002 | Baumann et al. |
| 2002/0112116 A1 | 8/2002 | Nelson |
| 2002/0116399 A1 | 8/2002 | Camps et al. |
| 2002/0167538 A1 | 11/2002 | Bhetanabhotla |
| 2002/0178271 A1 | 11/2002 | Graham et al. |
| 2002/0184375 A1 | 12/2002 | Wagner et al. |
| 2003/0184653 A1 | 10/2003 | Ohkubo |
| 2003/0208490 A1 | 11/2003 | Larrea et al. |
| 2004/0135904 A1 | 7/2004 | Shiota et al. |
| 2004/0189707 A1 | 9/2004 | Moore et al. |
| 2005/0033777 A1 | 2/2005 | Moraes et al. |
| 2005/0131992 A1 | 6/2005 | Goldstein et al. |
| 2006/0059174 A1 | 3/2006 | Mese et al. |
| 2006/0159127 A1 | 7/2006 | Childress et al. |
| 2006/0229932 A1 | 10/2006 | Zollo et al. |
| 2006/0242581 A1 | 10/2006 | Manion et al. |
| 2007/0130221 A1* | 6/2007 | Abdo ............... G06F 21/6227 |
| 2007/0250401 A1 | 10/2007 | Hearn et al. |
| 2008/0123904 A1 | 5/2008 | Sakamoto et al. |
| 2008/0126476 A1 | 5/2008 | Nicholas et al. |
| 2008/0165141 A1 | 7/2008 | Christie |
| 2008/0177623 A1 | 7/2008 | Fritsch et al. |
| 2008/0195956 A1 | 8/2008 | Baron et al. |
| 2008/0270398 A1 | 10/2008 | Landau et al. |
| 2009/0112868 A1 | 4/2009 | Rajamani et al. |
| 2009/0327975 A1 | 12/2009 | Stedman |
| 2010/0017426 A1 | 1/2010 | Marston |
| 2010/0046392 A1 | 2/2010 | Childress et al. |
| 2010/0070707 A1 | 3/2010 | Nishimura |
| 2010/0161441 A1 | 6/2010 | Hounsell |
| 2010/0211575 A1 | 8/2010 | Collins et al. |
| 2010/0241971 A1 | 9/2010 | Zuber |
| 2010/0250337 A1 | 9/2010 | Kassaei |
| 2010/0251305 A1 | 9/2010 | Kimble et al. |
| 2010/0256981 A1 | 10/2010 | Nielsen et al. |
| 2010/0332846 A1 | 12/2010 | Bowden et al. |
| 2010/0332958 A1 | 12/2010 | Weinberger et al. |
| 2011/0010672 A1 | 1/2011 | Hope |
| 2011/0044512 A1 | 2/2011 | Bambha et al. |
| 2011/0208668 A1 | 8/2011 | Phillips |
| 2011/0289423 A1 | 11/2011 | Kim et al. |
| 2012/0032436 A1 | 2/2012 | Zantout et al. |
| 2012/0072449 A1 | 3/2012 | Patch et al. |
| 2012/0078845 A1 | 3/2012 | Kasbekar et al. |
| 2012/0084689 A1 | 4/2012 | Ledet et al. |
| 2012/0089610 A1 | 4/2012 | Agrawal et al. |
| 2012/0096046 A1* | 4/2012 | Kucera ..................... 707/802 |
| 2012/0136936 A1 | 5/2012 | Quintuna |
| 2012/0192086 A1 | 7/2012 | Ghods et al. |
| 2012/0197980 A1 | 8/2012 | Terleski et al. |
| 2012/0213404 A1 | 8/2012 | Steiner |
| 2012/0233227 A1 | 9/2012 | Alexander et al. |
| 2012/0254332 A1 | 10/2012 | Irvin |
| 2012/0290609 A1 | 11/2012 | Britt |
| 2012/0290926 A1 | 11/2012 | Kapadia et al. |
| 2012/0290947 A1 | 11/2012 | Baggett et al. |
| 2012/0303477 A1 | 11/2012 | Ben-Itzhak |
| 2012/0303684 A1 | 11/2012 | Sakurai et al. |
| 2012/0324368 A1 | 12/2012 | Putz et al. |
| 2013/0014023 A1 | 1/2013 | Lee et al. |
| 2013/0024464 A1 | 1/2013 | Berner et al. |
| 2013/0073976 A1* | 3/2013 | McDonald et al. .......... 715/739 |
| 2013/0080940 A1 | 3/2013 | Reeves et al. |
| 2013/0104080 A1 | 4/2013 | Bosworth et al. |
| 2013/0132896 A1 | 5/2013 | Lee et al. |
| 2013/0138674 A1 | 5/2013 | Jeong et al. |
| 2013/0138685 A1 | 5/2013 | Brucher et al. |
| 2013/0173637 A1 | 7/2013 | Kim et al. |
| 2013/0185638 A1 | 7/2013 | Tischer |
| 2013/0188886 A1 | 7/2013 | Petrou et al. |
| 2013/0202198 A1 | 8/2013 | Adam et al. |
| 2013/0263289 A1 | 10/2013 | Vijayan et al. |
| 2013/0339435 A1 | 12/2013 | De Armas |
| 2014/0019317 A1 | 1/2014 | Casares et al. |
| 2014/0019910 A1 | 1/2014 | Kim et al. |
| 2014/0029798 A1 | 1/2014 | Flynn et al. |
| 2014/0067702 A1 | 3/2014 | Rathod |
| 2014/0068443 A1 | 3/2014 | Eng et al. |
| 2014/0164535 A1 | 6/2014 | Lynch et al. |
| 2014/0236722 A1 | 8/2014 | Rathus et al. |
| 2014/0317552 A1 | 10/2014 | Romatoski |
| 2015/0193521 A1 | 7/2015 | Schoeffler et al. |
| 2015/0363062 A1 | 12/2015 | Gunn |
| 2015/0363640 A1 | 12/2015 | Meyer |

FOREIGN PATENT DOCUMENTS

| | | |
|---|---|---|
| EP | 2187322 A1 | 5/2010 |
| EP | 2458512 | 5/2012 |
| WO | WO0051021 | 8/2000 |
| WO | WO03090096 | 10/2003 |
| WO | WO2007085083 | 8/2007 |
| WO | WO2009032712 | 3/2009 |
| WO | 2012092025 | 7/2012 |

(56) References Cited

FOREIGN PATENT DOCUMENTS

OTHER PUBLICATIONS

Flayvr, A. Mobile App That Automatically Creates Photo Albums, Raises $450K Seed Round, TechCrunch, Oct. 4, 2012, http://techcrunch.com/2012/10/04/flayvr-a-mobile-app-that-automatically-creates-photo-albums-raises-450k-seed-round/.
Lowe, D., "Object recognition from local scale-invariant features," International Conference on Computer Vision Corfu, Greece (Sep. 1999) pp. 1150-1157.
Larson, Michael, "Probing Network Characteristics: A Distributed Network Performance Framework", Dr. Dobb's Journal, Jun. 2004, pp. 22-29.
ISR and Written Opinion of the International Searching Authority for International Application No. PCT/US2015010618, Mar. 25, 2015.
ISR & Written Opinion, RE: Application # PCT/US2015/020375; Jun. 12, 2015.
ISR & Written Opinion, RE: Application #PCT/US2015/020378 citing new art; Aug. 18, 2015.

\* cited by examiner

METHODS FOR GENERATING AN ACTIVITY STREAM

BACKGROUND

The disclosure herein relates generally to methods for generating an activity stream.

Computer systems are known that allow for shared access to objects. As one example, shared storage systems allow users to create or store objects such as files at a remote server, access the files via a network such as the internet, grant shared access to the files to other users, and in some examples, edit the file using a file creation and editing system that is associated with the shared storage system. As another example, a calendar application can allow a user to create a calendar object and grant shared access to the calendar objects to other users. As another example, a task management application can allow creation of task objects for assigning tasks to other users, thus granting the other users shared access to the task object. Shared access to an object by a second user can include any or all of the ability to view the object, modify the object, share the object with additional users, make copies of the object, and delete the object. These types of systems are referred to herein as shared access systems. Shared access systems can allow actions to be taken with respect to an object. As an example, some online document storage and editing systems store files and allow multiple users who have been granted access to a particular file to take actions such as viewing and editing the file. In some shared access systems, users can be provided with information regarding actions taken with respect to certain objects by other users.

SUMMARY

The disclosure relates to methods for generating an activity stream.

One aspect of the disclosed embodiments is a method that includes receiving, at one or more server computers, an activity information request regarding an object; determining whether a user associated with the activity information request is currently authorized to access the object or was previously authorized to access the object; if the user is currently authorized to access the object, permitting unrestricted access to a plurality of activity information items describing actions associated with the object; and if the user was previously authorized to access the object, permitting access to a filtered set of activity information items based on the plurality of activity information items.

Another aspect of the disclosed embodiments is a non-transitory computer-readable storage device including program instructions executable by one or more processors that, when executed, cause the one or more processors to perform operations. The operations include receiving, at one or more server computers, an activity information request regarding an object; determining whether a user associated with the activity information request is currently authorized to access the object or was previously authorized to access the object; if the user is currently authorized to access the object, permitting unrestricted access to a plurality of activity information items describing actions associated with the object; and if the user was previously authorized to access the object, permitting access to a filtered set of activity information items based on the plurality of activity information items.

Another aspect of the disclosed embodiments is an apparatus that includes one or more processors and one or more memory devices for storing program instructions used by the one or more processors. The program instructions, when executed by the one or more processors, cause the one or more processors to receive, at one or more server computers, an activity information request regarding an object; determine whether a user associated with the activity information request is currently authorized to access the object or was previously authorized to access the object; if the user is currently authorized to access the object, permit unrestricted access to a plurality of activity information items describing actions associated with the object; and if the user was previously authorized to access the object, permit access to a filtered set of activity information items based on the plurality of activity information items.

BRIEF DESCRIPTION OF THE DRAWINGS

The description herein makes reference to the accompanying drawings wherein like reference numerals refer to like parts throughout the several views, and wherein.

DETAILED DESCRIPTION

Methods for generating an activity stream are described herein. In shared access systems, an activity stream can be generated to provide notifications regarding actions taken with respect to one or more objects. The systems and methods described herein generate activity streams based in part on information describing whether a user is currently authorized to access an object, which is referred to herein as access control information. In the systems and methods described here, an activity stream can include information describing certain actions taken with respect to an item that a user was previously authorized to access, but is not currently authorized to access.

Figure 1:
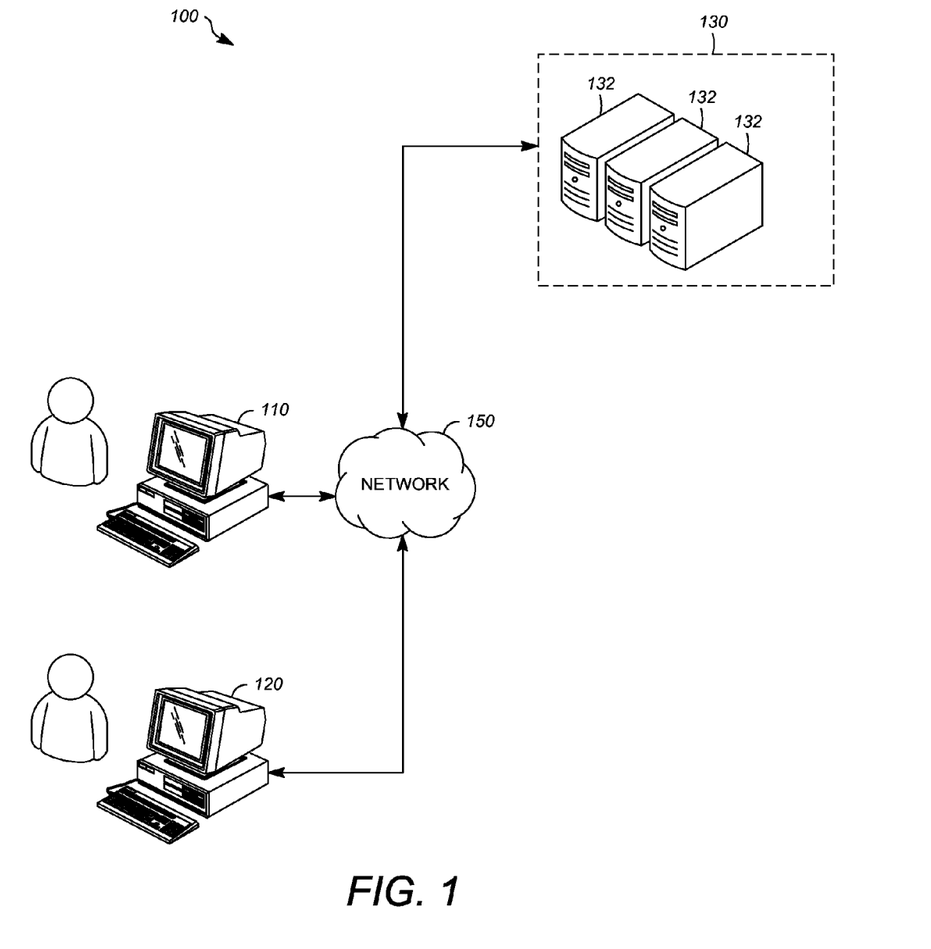
FIG. 1 is a block diagram showing an example of an environment in which a system for generating an activity stream can be implemented.

FIG. 1 shows an example of an environment 100 in which a system for generating an activity stream can be implemented. The environment 100 can include a user system 110, one or more additional user systems 120, and an application hosting service 130. The user system 110 and the additional user systems 120 are each representative of a large number (e.g. millions) of systems that can be included in the environment 100, with each system being able to utilize one or more applications that are provided by the application hosting service 130. The user system 110 and the additional user systems 120 can each be any manner of computer or computing device, such as a desktop computer, a laptop computer, a tablet computer, or a smart-phone (a computationally-enabled mobile telephone). The application hosting service 130 can be implemented using one or more server computers 132. The user system 110, the additional user systems 120, and the application hosting service 130 can each be implemented as a single system, multiple systems, distributed systems, or in any other form.

The systems, services, servers, and other computing devices described here are in communication via a network 150. The network 150 can be one or more communications networks of any suitable type in any combination, including wireless networks, wired networks, local area networks, wide area networks, cellular data networks, and the internet.

The application hosting service 130 can provide access to one or more hosted applications to a defined group of users including operators associated with the user system 110 and the additional user systems 120. As used here, a shared workspace is any manner of system, program, or interface that allows a defined group of users to utilize an access-restricted system in which information can be shared between users for the purpose of collaboratively working on a project. As will be discussed below, shared workspaces can implement document storage, creation, and editing functions. In some implementations, the application hosting service 130 allows a particular shared workspace to be accessed upon presentation of a credential, such as a username and password combination, that are associated with a registered user of that particular shared workspace. In some implementations, one or more users of each shared workspace are able to grant access to additional users or revoke access from existing users.

Figure 2:
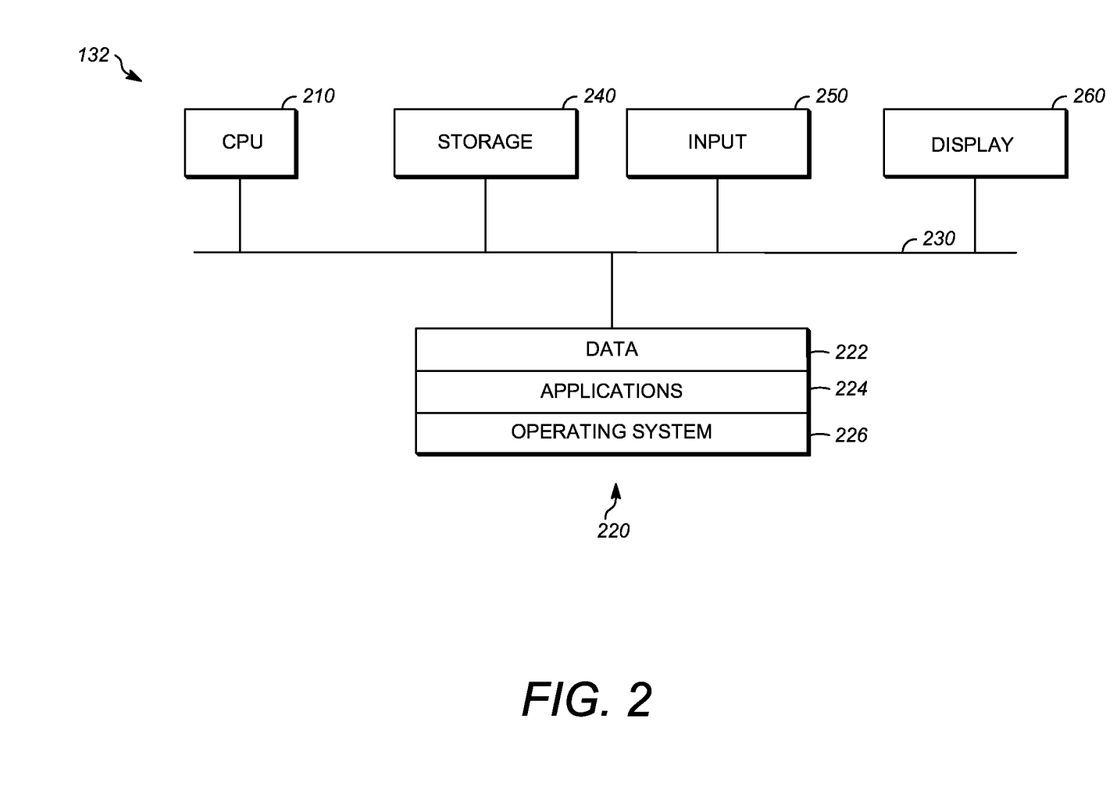
FIG. 2 is a block diagram showing an example of a hardware configuration for a server computer.

FIG. 2 is a block diagram of an example of a hardware configuration for the one or more server computers 132 of FIG. 1. The same hardware configuration or a similar hardware configuration can be used to implement the user system 110 and the additional user systems 120. Each server computer 132 can include a CPU 210. The CPU 210 can be a conventional central processing unit. Alternatively, the CPU 210 can be any other type of device, or multiple devices, capable of manipulating or processing information now-existing or hereafter developed. Although the disclosed examples can be practiced with a single processor as shown, e.g. CPU 210, advantages in speed and efficiency can be achieved using more than one processor.

Each server computer 132 can include memory 220, such as a random access memory device (RAM). Any other suitable type of storage device can also be used as the memory 220. The memory 220 can include code and data 222 that can be accessed by the CPU 210 using a bus 230. The memory 220 can further include one or more application programs 224 and an operating system 226. The application programs 224 can include software components in the form of computer executable program instructions that cause the CPU 210 to perform the operations and methods described here.

A storage device 240 can be optionally provided in the form of any suitable computer readable medium, such as a hard disc drive, a memory device, a flash drive, or an optical drive. One or more input devices 250, such as a keyboard, a mouse, or a gesture sensitive input device, receive user inputs and can output signals or data indicative of the user inputs to the CPU 210. One or more output devices can be provided, such as a display device 260. The display device 260, such as a liquid crystal display (LCD) or a cathode-ray tube (CRT), allows output to be presented to a user, for example, in response to receiving a video signal.

Although FIG. 2 depicts the CPU 210 and the memory 220 of each server computer 132 as being integrated into a single unit, other configurations can be utilized. The operations of the CPU 210 can be distributed across multiple machines (each machine having one or more of processors) which can be coupled directly or across a local area or other network. The memory 220 can be distributed across multiple machines such as network-based memory or memory in multiple machines. Although depicted here as a single bus, the bus 230 of each of each server computer 132 can be composed of multiple buses. Further, the storage device 240 can be directly coupled to the other components of the respective server computer 132 or can be accessed via a network and can comprise a single integrated unit such as a memory card or multiple units such as multiple memory cards. The one or more server computers can thus be implemented in a wide variety of configurations.

Figure 3:
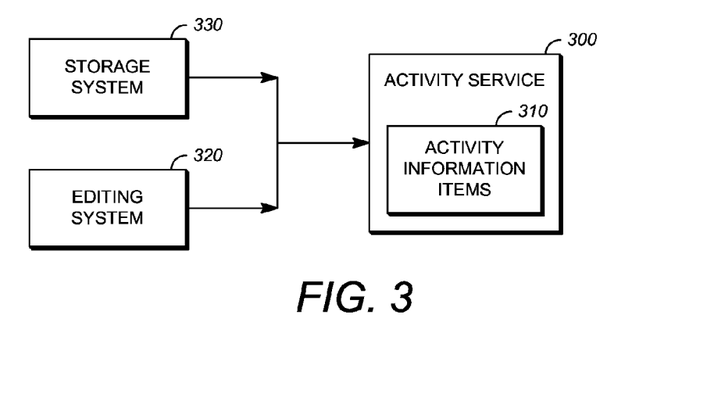
FIG. 3 is a block diagram showing a plurality of shared access systems and an activity service.

FIG. 3 is a block diagram showing a plurality of shared access systems that are in communication with an activity service 300. In the illustrated example, the shared access systems include a storage system 330 and an editing system 320. The storage system 330 and the editing system 320 are examples of systems that can be in communication with the activity service 300. It should be understood, however, that different or additional systems could be utilized in conjunction with the activity service 300. Each of these systems and services can be, for example, provided in the form of software instructions that are executed by a processor or computer, such as the one or more server computers 132 of the application hosting service 130.

The storage system 330 is operable to provide a remotely accessible interface by which users can store files, access those files, and share those files with other users. The storage system 330 can provide access via, for example, a web based interface that can be output for display in the context of a web browser at a client device, such as the user system 110. The editing system 320 is a network accessible system that allows for the creation and editing of documents. The editing system 320 can, in some implementations, be utilized in conjunction with the storage system 330 to obtain documents from the storage system 330 and to store documents at the storage system 330. In some implementations, the editing system 320 is accessible via a web browser based interface that can be output for display at a client device, such as at the user system 110.

The activity service 300 is operable to receive information from shared access services describing actions taken with respect to objects at the shared access services. The information that is received by the activity service 300 can be stored in the form of activity information items 310, which are stored at the activity service 300 or are stored such that they are accessible to the activity service 300. For example, the activity service 300 can be implemented by the application hosting service 130, and the activity information items 310 can be stored at storage devices that are associated with and managed by the application hosting service 130. The activity information items 310 can include information describing, for example, an identity of an object, an action taken with respect to that object, the identities of one or more users associated with the action, information related to the time at which the action occurred, and information identifying one or more systems that were involved executing the action with respect to the object. The activity information items 310 can be stored in any suitable form. As one example, the activity information items can be stored as objects in a data base.

Figure 4:
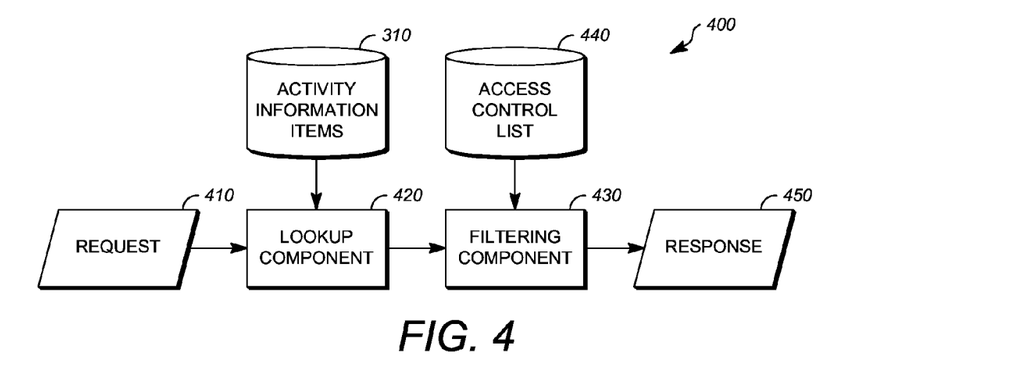
FIG. 4 is a block diagram showing operation of an activity stream generator.

The activity information items 310 can be utilized to provide insight to users as to the actions that have been taken with respect to one or more objects. This information can be provided to users in a meaningful format using a system or service such as an activity stream generator 400, as shown in FIG. 4. An activity information request 410 is received as an input at a look-up component 420 of the activity stream generator 400. The activity information request 410 can originate from a user. For example, the activity information request 410 can be received at the application hosting service 130 from the user system 110 via the network 150. The activity information request 410, relates to one or more objects. As one example, the activity information request 410 can specify one or more objects to which the activity information request 410 relates. As another example, the request can include information for identifying one or more objects to which the activity information request 410 relates. As an example, the activity information request 410 could be a request for activity information items that relate to actions taken by a specific user with respect to one or more specified objects, which will be identified by the look-up component 420 using the activity information items 310. The look-up component 420 receives the activity information request 410, and identifies one or more activity information items 310 that match the activity information request 410. Information relating to activity information items 310, such as identifying information or the items themselves, is passed from the look-up component 420 to a filtering component 430.

The filtering component 430 is operable to determine whether the user that is associated with the activity information request 410 is authorized to access the activity information items 310 that were identified by the look-up component 420 as being responsive to the activity information request 410. The filtering component 430 can make this determination based on, for example, access control information such as one or more access control lists 440. In one implementation, the access control list 440 can include access control information on a per object basis, such as information identifying a specific object, a specific user, and whether or not the specific user is allowed to access the specific object. The access control list 440 can include information identifying a date on which a specific user was granted access to a specific object. The access control list 440 can also include information describing a date and time on which a specific user's access to an object was revoked in an alternative implementation, the access control list 440 can include access control information on a per activity information item level instead of or in addition to access control information on a per object level. For example, when the activity service 300 generates an activity information item 310 for a specific object, the activity service 300 can also store access control information for that activity information item 310. In one implementation, the activity service 300 enters access control information into the access control list 440 for a specific one of the activity information item 310 that sets the access control for a specific one of the activity information items 310 to authorize access for that activity information item to the users that were authorized to access the object at the time the action was taken. In implementations where the access control list 440 includes access control information on a per activity information item basis, authorization to access the activity information items 310 may or may not be affected by a change to a user's authorization to access the corresponding object.

If the filtering component determines that the user that made the activity information request 410 is currently authorized to access the object or objects to which the activity information request 410 relates, the filtering component 430 can permit unrestricted access to the activity information items that were identified by the look-up component 420 as describing actions associated with the object or objects. If the filtering component 430 determines that the user was previously authorized to access the object, but is not currently authorized to access the object, the filtering component 430 can permit access to a filter set of the activity information items 310 based on the activity information items 310 that were identified by the look-up component 420. If the filtering component 430 determines that the user is not currently authorized to access the object and was not previously authorized to access the object, the filtering component 430 can deny access to the activity information items 310 that were identified by the look-up component 420. The filtering component 430 is operable to output a response 450, such as information that can be transmitted to a client device such as the user system 110, and the output for display at the client device. The response 450 can include the activity information items 310 that the user is authorized to access, or can be based on some or all of the activity information items 310 that the user is authorized to access.

Figure 5A:
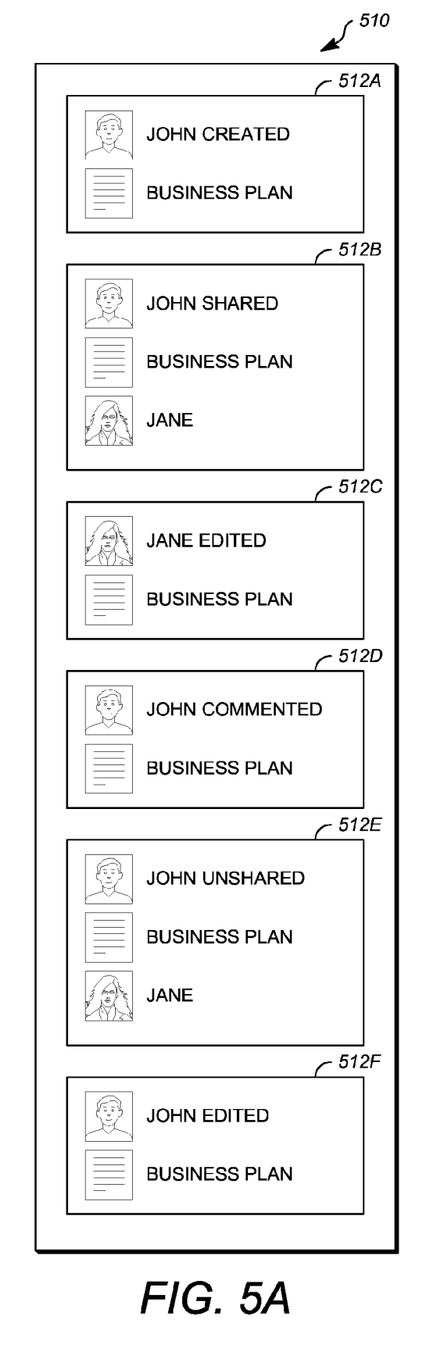
FIGS. 5A-5D are examples of activity streams.

FIG. 5A shows at activity stream 510 according to a first example. The activity stream 510 can, in some implementations be displayed in the context of a web browser by way of a web page that is encoded in a mark-up language such as HTML that is transmitted from the application hosting service 130 to the user system 110 and output for display at the user system 110. In other examples, the activity stream 510 can be presented in a different type of application, such as a standalone application.

The activity stream 510 is an example of an activity stream that includes activity information items describing all of the actions that have taken with respect to an object, and can be generated, for example, by the activity stream generator 400 of FIG. 4 based on unrestricted access to the plurality of activity information items 310 describing actions associated with the object. Thus, the activity stream 510 represents what might be seen by a user who is currently authorized to access an object in response to sending an activity information request regarding that object.

The activity stream 510 can include a plurality of activity notification elements that each identify an object to which the activity notification element relates, one or more users to which the activity notification element relates, and an action to which the activity notification element relates. In the illustrated example, the activity stream 510 includes a creation notification element 512a, a share notification element 512b, a first edit notification element 512c, a comment notification element 512d, an unshare notification element 512e, and a second edit notification element 512f. The creation notification element relates to a user identified as John, and states that John created an object, which in this case is a document, entitled "Business Plan." The activity notification elements, including the creation notification element 512a, can include one or more icons representing that the users to which a notification element relates, the action to which the notification element relates, and the object to which the notification element relates. In this example, the creation notification element can include an icon, such as a photograph, that represents the user John, and an icon that identifies the object "Business Plan" as a document. The share notification element 512b indicates that user John shared the document "Business Plan" with a second user named Jane. The first edit notification element 512c indicates that Jane edited the document entitled "Business Plan." The comment notification element 512d indicates that user John commented on the document entitled "Business Plan." The unshare notification element 512e indicates that user John changed the access settings for the document entitled "Business Plan" such that it is no longer shared with user Jane. The second edit notification element 512f indicates that user John edited the document identified "Business Plan." In this example, the share notification element 512b is a notification element regarding an access grant event by which Jane was granted access to the "Business Plan" object. The unshare notification element 512e relates to an access revocation event by which access to the "Business Plan" object was revoked from Jane by John.

Figure 5B:
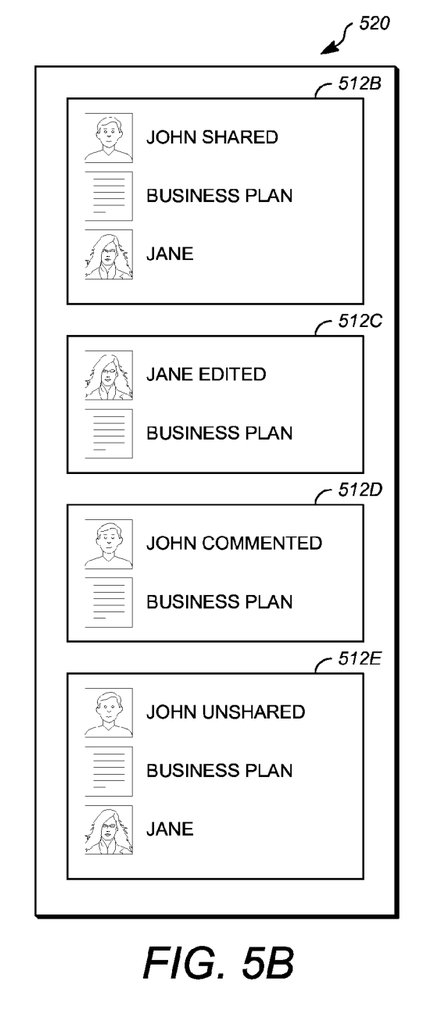

FIG. 5B shows an activity stream 520 according to a second example, which is similar to the activity stream 510 according to the first example unless otherwise noted herein. The activity stream 520 relates to the same object and actions as described with respect to the activity stream 510 of the first example. However, the activity stream 520 has been generated based on a filtered set of the activity information items 310 that correspond to the "Business Plan" document based on the same activity information items 310 that the activity stream 510 is based on. In particular, the activity stream 520 can represent an activity stream that is generated in response to a request from user Jane, subsequent to a point in time in which an access revocation event for the "Business Plan" document occurred with respect to Jane. Thus, the activity stream 520 is generated based on a filtered set of the activity information items 310 that relate to the "Business Plan" document. In this example, the filtering component 430 of the activity stream generator 400 has filtered the activity information items 310 that relate to the "Business Plan" document by excluding information describing information and actions that occurred prior to an access grant event that granted access to the "Business Plan" document to Jane, and by excluding information describing actions that occurred subsequent to an access revocation event that revoked access to the "Business Plan" document from user Jane. Thus, the activity stream 520 includes the share notification element b, the first edit notification element 512c, the comment notification element 512d, and the unshare notification element 512e. As an example, the filtering applied by the filtering component 430 of the activity stream generator 400 can permit access to a filtered set of activity information items by identifying a time period starting at the access grant event that granted access to the object, here the "Business Plan" document, to the user, with time period ending at an access revocation event that revoked access to the document from the user. Activity information items 310 that describe actions that occurred outside of this time period are excluded from the filtered set of activity information items by the filtering component.

Figure 5C:
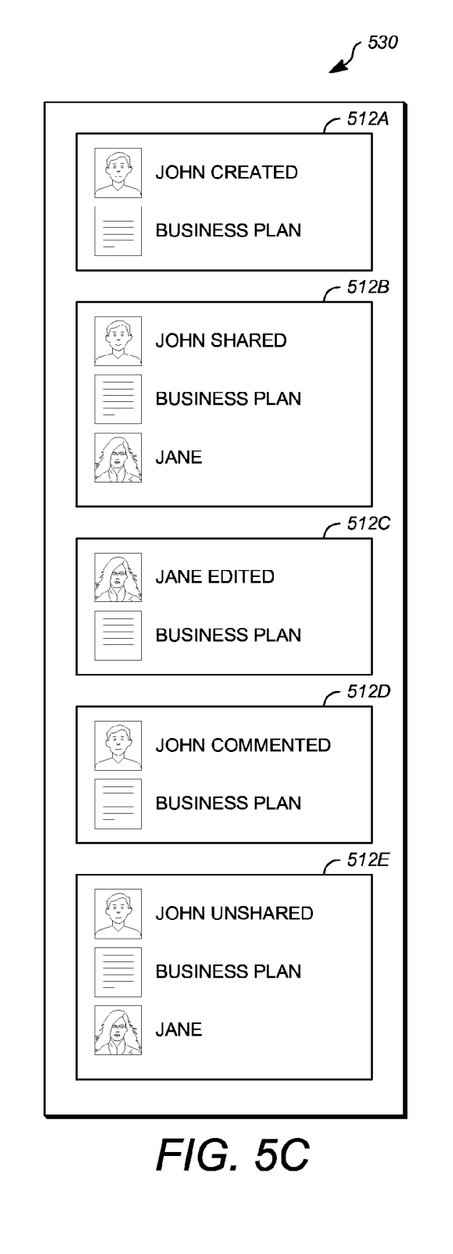

FIG. 5C shows an activity stream 530 according to a third example. The activity stream 530 is similar to the activity stream 510, except as otherwise noted herein. The activity stream 530 can be generated in response to an activity information request from user Jane at a time subsequent to a revocation event by which Jane was no longer authorized to access the "Business Plan" document based on the same activity information items 310 that the activity stream 510 is based on. In this example, the filtering component 530 has permitted access to a filtered set of activity information items by excluding activity information items describing actions that occurred subsequent to the access revocation event and revoked access to the "Business Plan" document from Jane. In contrast to the activity stream 520 of the second example, the activity stream 530 includes notification elements that relate to actions that occurred prior to the time at which Jane was authorized to access the "Business Plan" document. Thus, the activity stream 530 of the third example includes the creation notification element 512a, the share notification element 512b, the first edit notification element 512c, the comment notification element 512d, and the unshare notification element 512e.

Figure 5D:
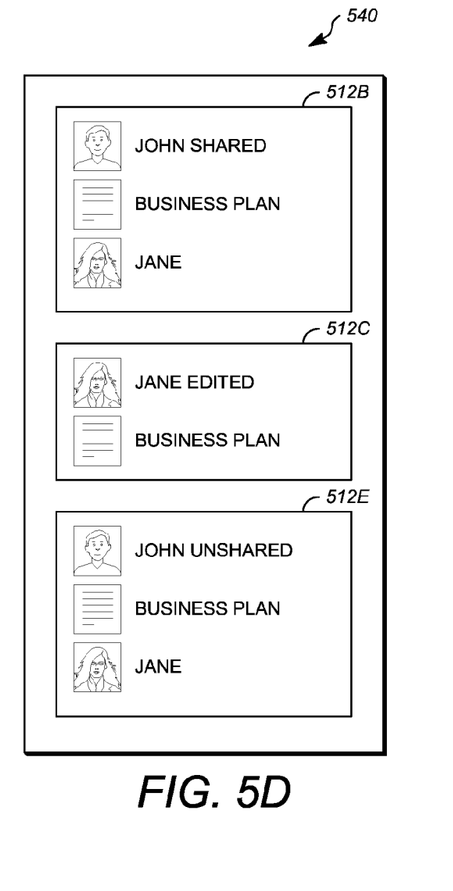

FIG. 5D shows an activity stream 540 according to a fourth example. The activity stream 540 is similar to the activity stream 510 except as otherwise noted herein. The activity stream 540 is an example of an activity stream that can be generated in response to an activity information request made by user Jane subsequent to a point in time at which an access revocation event has occurred with respect to user Jane for the "Business Plan" document. The activity stream 540 represents a filtered set of the activity information items regarding the "Business Plan" document. In particular, the filtering component 430 has generated this filtered set of activity information items by excluding information describing actions that do not reference user Jane, based on the same activity information items that the activity stream 510 is based on. Thus, all of the included actions were either taken by Jane or made with reference to Jane. Thus, the activity stream 540 includes the share notification element 512b which shared access to the "Business Plan" document with Jane, the first edit notification element 512c which relates to edits made to the "Business Plan" document by Jane, and the unshare notification element 512e representing the revocation event where user John changed the access control for the "Business Plan" document such that Jane was no longer authorized to access it.

Figure 6:
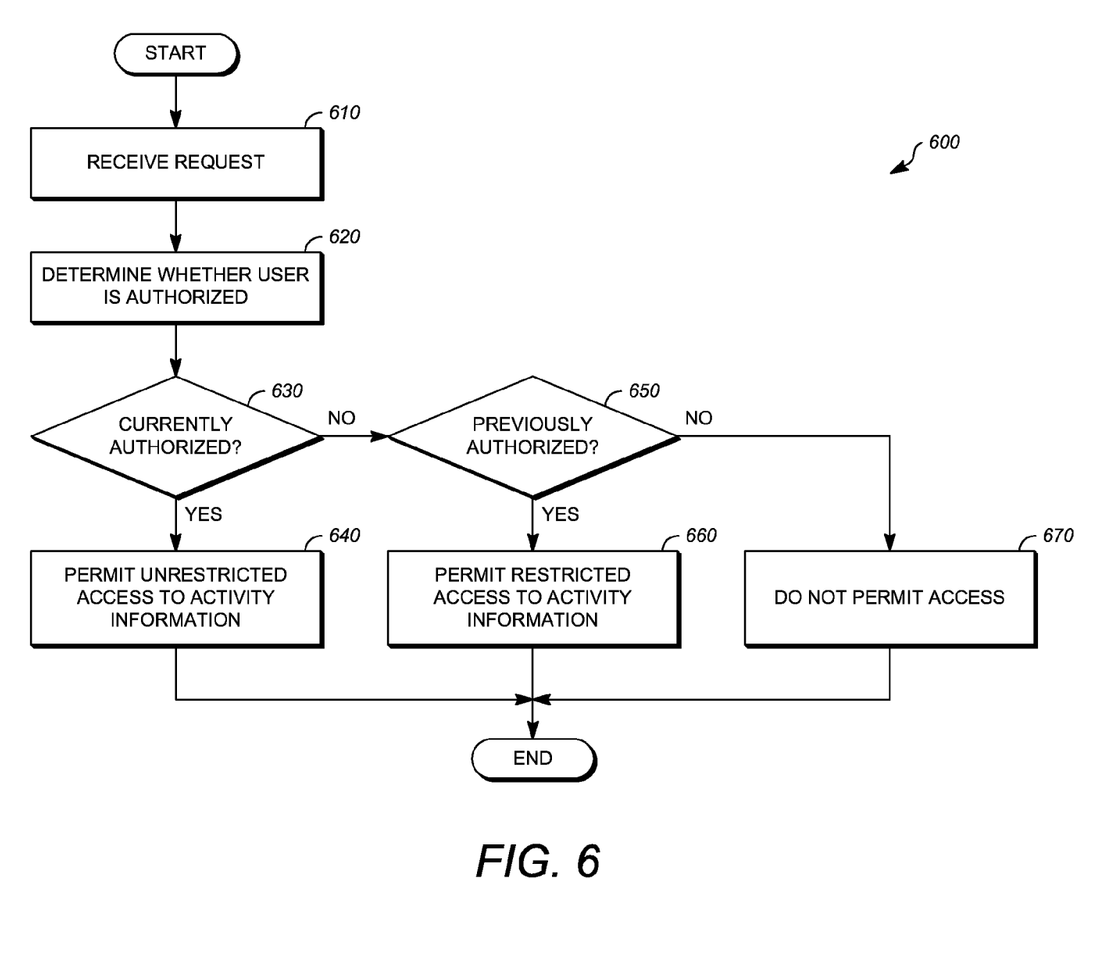
FIG. 6 is a flowchart showing an example of a process for generating an activity stream.

FIG. 6 is a flow chart showing a process 600 for generating an activity stream. The operations described in connection with the process 600 can be performed at one or more computers, such as at the one or more server computers 132 of the application hosting service 130. When an operation is performed by one or more computers, it is completed when it is performed by one computer. The operations described in connection with the process 600 can be embodied as a non-transitory computer readable storage medium including program instructions executable by one or more processors that, when executed, cause the one or more processors to perform the operations. For example, the operations described in connection with the process 600 could be stored at the memory 220 of a respective one of the server computers 132 and be executable by the CPU 210 thereof.

At operation 610 an activity information request is received. As an example, the activity information request can be received at the application hosting service 130 from the user system 110. Receiving can include any or all of receiving by transmission over a network, receiving from a memory device, receiving from a storage device, or receiving from another system, service, or process. As one example, receiving an activity information request can be as described with respect to the activity information request 410 in the context of the activity stream generator 400.

At operation 620 a determination is made as to whether the user from whom the activity information request originated is authorized to access the object or objects referenced by the activity information request. This can be performed, for example, by obtaining access control information, such as described with respect to the filtering component 430 and the access control list 440.

At operation 630, if the user is currently authorized to access the object or objects referenced by the request, the process advances to operation 640 where unrestricted access to the activity information is permitted. The activity information item can then be incorporated in a response that is either transmitted to the user who made the request, or is utilized as the basis for generating a further output, such as an activity stream that includes at least some of the activity information items.

If, at operation 630, it is determined that the user is not currently authorized to access the object or objects to which the activity information request pertains, the process advances to operation 650. At operation 650 a determination is made as to whether the user was previously authorized to access the object to which the activity information request pertains. If the user was previously authorized to access the object or objects, the process advances to operation 660 where restricted access to the activity information items is permitted. This can be performed, for example, as described with respect to the filtering component 430 of the activity stream generator 400 and as further described with respect to FIGS. 5B, 5C and 5E.

If, at operation 650, it is determined that the user was not previously authorized to access the object or objects to which the activity information request pertains, the process advances to operation 670, where access to the objects is not permitted. The process then ends.

The foregoing description describes only some exemplary implementations of the described techniques. Other implementations are available. For example, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

The implementations of the computer devices (e.g., clients and servers) described herein can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of each of the clients and each of the servers described herein do not necessarily have to be implemented in the same manner.

Operations that are described as being performed by a single processor, computer, or device can be distributed across a number of different processors, computers or devices. Similarly, operations that are described as being performed by different processors, computers, or devices can, in some cases, be performed by a single processor, computer or device.

Although features may be described above or claimed as acting in certain combinations, one or more features of a combination can in some cases be excised from the combination, and the combination may be directed to a sub-combination or variation of a sub-combination.

The systems described herein, such as client computers and server computers, can be implemented using general purpose computers/processors with a computer program that, when executed, carries out any of the respective methods, algorithms and/or instructions described herein. In addition or alternatively, for example, special purpose computers/processors can be utilized which can contain specialized hardware for carrying out any of the methods, algorithms, or instructions described herein.

Some portions of above description include disclosure presented in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality. It should be noted that the process steps and instructions of implementations of this disclosure could be embodied in software, firmware or hardware, and when embodied in software, could be downloaded to reside on and be operated from different platforms used by real time network operating systems.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

At least one implementation of this disclosure relates to an apparatus for performing the operations herein. This apparatus may be specially constructed for the required purposes, or it may comprise a general-purpose computer selectively activated or reconfigured by a computer program stored on a computer readable storage medium that can be accessed by the computer.

All or a portion of the embodiments of the disclosure can take the form of a computer program product accessible from, for example, a non-transitory computer-usable or computer-readable medium. The computer program, when executed, can carry out any of the respective techniques, algorithms and/or instructions described herein. A non-transitory computer-usable or computer-readable medium can be any device that can, for example, tangibly contain, store, communicate, or transport the program for use by or in connection with any processor. The non-transitory medium can be, for example, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for tangibly containing, storing, communicating, or transporting electronic instructions.

It is to be understood that the disclosure is not to be limited to the disclosed embodiments but, on the contrary, is intended to cover various modifications and equivalent arrangements included within the spirit and scope of the appended claims.

What is claimed is:

1. A method, comprising:
   storing, at one or more server computers, an object;
   storing, at the one or more server computers, activity information items, wherein the activity information items describe actions taken with respect to the object;
   storing, at the one or more server computers, access control information for the object;
   receiving, at one or more server computers from a user at a current time, an activity information request by which the user requests access to the activity information items; and
   in response to the activity information request, providing access to a filtered set of the activity information items if the access control information indicates that the user is not permitted to access the object at the current time, wherein the filtered set of the activity information items includes only activity information items that represent actions taken during a time period starting at an access grant event that granted the user access to the object and ending at an access revocation event that revoked access to the object from the user.

2. The method of claim 1, wherein the filtered set of the activity information items excludes activity information items describing actions that occurred subsequent to the access revocation event.

3. The method of claim 2, wherein the filtered set of activity information items excludes information describing actions that occurred prior to the access grant event.

4. The method of claim 1, wherein the activity information items include information output by one or more systems that provide shared access to the object.

5. The method of claim 1, wherein the current time is subsequent to the time period starting at the access grant event and ending at the access revocation event.

6. The method of claim 1, further comprising:
   in response to the activity information request, providing unrestricted access to the activity information items if the access control information indicates that the user is permitted to access the object at the current time.

7. A non-transitory computer-readable storage device including program instructions executable by one or more processors that, when executed, cause the one or more processors to perform operations, the operations comprising:
   storing, at one or more server computers, an object;
   storing, at the one or more server computers, activity information items, wherein the activity information items describe actions taken with respect to the object;
   storing, at the one or more server computers, access control information for the object;
   receiving, at one or more server computers from a user at a current time, an activity information request by which the user requests access to the activity information items; and
   in response to the activity information request, providing access to a filtered set of the activity information items if the access control information indicates that the user is not permitted to access the object at the current time, wherein the filtered set of the activity information items includes only activity information items that represent actions taken during a time period starting at an access grant event that granted the user access to the object and ending at an access revocation event that revoked access to the object from the user.

8. The non-transitory computer-readable storage device of claim 7, wherein the filtered set of the activity information items excludes activity information items describing actions that occurred subsequent to the access revocation event.

9. The non-transitory computer-readable storage device of claim 8, wherein the filtered set of activity information items excludes information describing actions that occurred prior to the access grant event.

10. The non-transitory computer-readable storage device of claim 7, wherein the activity information items include information output by one or more systems that provide shared access to the object.

11. The non-transitory computer-readable storage device of claim 7, wherein the current time is subsequent to the time period starting at the access grant event and ending at the access revocation event.

12. The non-transitory computer-readable storage device of claim 7, the operations further comprising:
    in response to the activity information request, providing unrestricted access to the activity information items if the access control information indicates that the user is permitted to access the object at the current time.

13. An apparatus, comprising:
    one or more processors; and
    one or more memory devices for storing program instructions used by the one or more processors, wherein the program instructions, when executed by the one or more processors, cause the one or more processors to:
    store, at one or more server computers, an object,
    store, at the one or more server computers, activity information items, wherein the activity information items describe actions taken with respect to the object,
    store, at the one or more server computers, access control information for the object,
    receive, at one or more server computers from a user at a current time, an activity information request by which the user requests access to the activity information items, and
    in response to the activity information request, provide access to a filtered set of the activity information items if the access control information indicates that the user is not permitted to access the object at the current time, wherein the filtered set of the activity information items includes only activity information items that represent actions taken during a time period starting at an access grant event that granted the user access to the object and ending at an access revocation event that revoked access to the object from the user.

14. The apparatus of claim 13, wherein the filtered set of the activity information items excludes activity information items describing actions that occurred subsequent to the access revocation event.

15. The apparatus of claim 14, wherein the filtered set of activity information items excludes information describing actions that occurred prior to the access grant event.

16. The apparatus of claim 13, wherein the activity information items include information output by one or more systems that provide shared access to the object.

17. The apparatus of claim 13, wherein the current time is subsequent to the time period starting at the access grant event and ending at the access revocation event.

18. The apparatus of claim 13, wherein the program instructions further cause the one or more processors to:
   in response to the activity information request, provide unrestricted access to the activity information items if the access control information indicates that the user is permitted to access the object at the current time.

\* \* \* \* \*